Patented Oct. 26, 1937

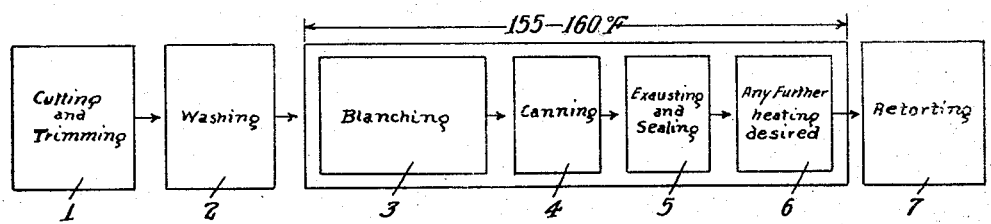
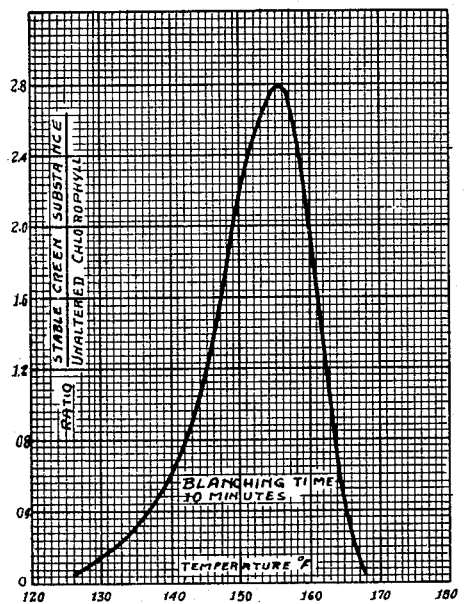
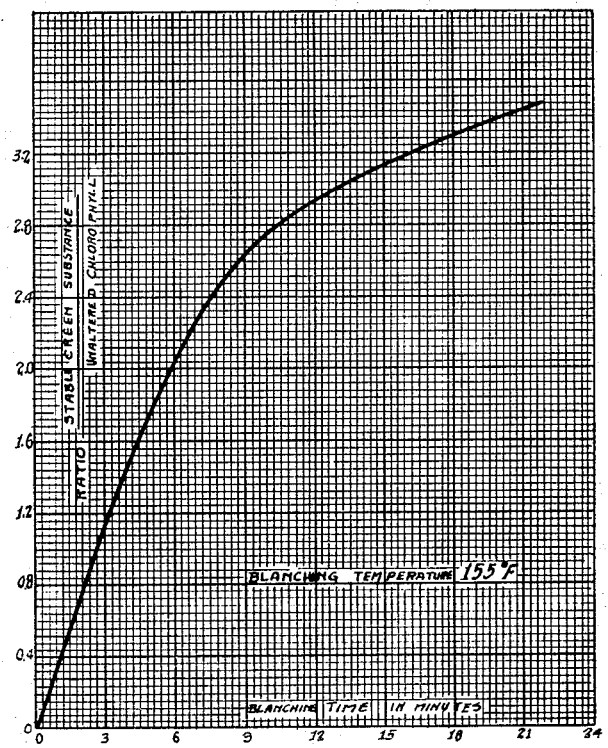

2,097,198

UNITED STATES PATENT OFFICE 2,097,198

PROCESS OF PREPARING SPINACH OR THE LIKE FOR CANNING

Byron E. Lesley, Oakland, and James W. Shumate, San Francisco, Calif., assignors to California Packing Corporation, San Francisco, Calif., a corporation of New York Application February 9, 1934, Serial No. 710,440

8 Claims. (Cl. 99—186)

This invention relates to a process of preparing spinach or like vegetables for canning, and is more particularly related to a method of preparing spinach or other vegetable to improve the color of the canned spinach.

This invention is directed to an improvement over the process for preparing spinach and the like for canning as disclosed in Letters Patent No. 1,685,511, granted September 25, 1928, to William E. Thomas.

In the preparation of spinach for canning, the heating of the spinach as heretofore commonly carried out has been so carried out as to fail to protect the chlorophyll or green coloring matter of the leaves of the spinach, resulting in the conversion of the green coloring matter of the leaves to a matter of the color of olive-greenish-brown, which gives to the canned spinach an unattractive appearance.

The coloring matter of the spinach or other chlorophyll containing vegetable which gives to the spinach, or such other vegetable, the green color, is not stable under the influence of heat and is readily converted into unattractive colored decomposition products.

We have found that this coloring matter or chlorophyll may be converted into a stable green color if the heating of the spinach or green coloring matter is carried on, so that at no time does the heat imparted to the spinach or other chlorophyll containing vegetable rise above the temperature at which the enzyme present in the vegetable or spinach is destroyed by the heat. We have found also that if the heat of the spinach is carried out at a temperature materially below the optimum temperature at which the enzymatic reaction occurs to convert the chlorophyll into the heat stable green coloring matter, that there is a failure of the enzymatic reaction to occur, or the reaction occurs too slowly to be commercially applicable.

We have further found that the chlorophyll giving the color to the spinach or other chlorophyll-containing vegetable, may be converted into the heat resistant coloring matter which will retain in the spinach or other chlorophyll-containing vegetable, its characteristic green color, and that the conversion of the chlorophyll into the heat resisting green coloring matter is a function of both time and temperature at which the conversion is caused to take place, and that if the spinach or chlorophyll-containing vegetable is maintained at the proper temperature for a sufficient period of time to permit the enzymes of the vegetable or spinach to break down the chlorophyll into one or more simpler bodies, one of which is believed to be the chlorophyllide, that the spinach or vegetable may be thereafter subjected to such heat as is required to sterilize the spinach or other chlorophyll-containing vegetable, either within cans or without the cans.

Such enzymatic reactions proceed slowly and are effective within a relatively narrow range of temperature and we have found are most effective at a critical temperature. We have found that the critical temperature of the enzymatic conversion of chlorophyll to a heat stable green coloring matter is between 155 and 160° F., and that the reaction proceeds for approximately 30 minutes in ordinary spinach, at which time further color conversion is unnoticeable.

As the reaction is a function of time and temperature, and it is only necessary to retain the spinach itself at between the temperature limits, or preferably at or near the above set forth critical temperatures, we have found that the conversion of the chlorophyll to the heat stable green coloring matter may be carried out at any point of the process of treatment of the spinach prior to retorting or sterilizing, and that it is not necessary to complete the enzymatic reaction of conversion of chlorophyll to the heat stable coloring matter in the blanching portion of the orthodox spinach-treating process as set forth by Thomas in his Patent No. 1,685,511.

It is therefore an object of our invention to provide a method of preparing spinach or other chlorophyll-containing vegetable for canning in which the spinach or other vegetable is treated at a temperature and for a sufficient period of time to permit the conversion of a material portion of the chlorophyll into heat stable green coloring matter.

Another object of our invention is to provide a method which may be commercially practicable for the preparation of spinach or other similar vegetable for canning by the use of which process the spinach or other similar vegetable may be wilted and maintained at a temperature at which the conversion of chlorophyll to the heat stable green coloring matter proceeds for a period of time sufficient to enable the conversion to continue to a point where uniform green color of the resultant product may be had.

Another object of this invention is to provide a method of treating spinach or the like for canning in which the spinach is wilted to enable packing in the cans of the requisite quantity of spinach and wherein the spinach in the cans is maintained at a temperature at which the enzymatic reaction will proceed to convert an appreciable quantity of unstable chlorophyll into a stable green coloring matter.

Other objects and advantages of this invention it is believed will be apparent from the following detailed description of a preferred embodiment thereof as illustrated in the accompanying drawing:

In the drawing:

Figure 1 is a flow sheet illustrating the preferred process embodying our invention.

Figure 2 is a graphic illustration of the relationship of stable green substance to unaltered chlorophyll wherein the time of heat treatment is maintained constant and the temperature of treatment is varied, illustrating the optimum temperature for the conversion of the chlorophyll to the heat resistant green coloring matter.

Figure 3 is a graphic illustration illustrating the ratio of conversion into stable green coloring matter as compared with the unaltered chlorophyll where the blanching temperature is maintained constant and illustrating the said ratio as compared with the time of treatment.

In the preferred embodiment of our invention as illustrated in the accompanying drawing, the spinach is first cleaned in any suitable or desirable manner, being first cut and trimmed at 1, from where it is passed into a washer 2 to wash foreign matter therefrom. The spinach from the washer 2 is conveyed to a blancher 3 wherein the spinach is blanched or wilted so that a sufficient or required quantity of the spinach may be packed into cans.

The spinach is placed into the cans at 4 and from the can-stuffing operation the spinach passes to an exhausting and sealing operation 5 where the air is exhausted from the cans and the cans are sealed in the customary manner as heretofore practiced. As the operation from wilting, can stuffing, exhausting and sealing does not necessarily require a sufficient period of time to enable the spinach to be maintained at or near the optimum temperature of between 155 to 160° F., it is then desirable to pass the sealed cans containing the spinach through a further heating chamber diagrammatically illustrated at 6, where the spinach in the cans is maintained for a further period of time at between the temperature of 155 to 160° F. As is apparent from the diagram 3, the ratio of conversion of the chlorophyll to the stable green substance occurs rather rapidly up to a period of slightly less than 9 minutes, at which time the apparent ratio of stable green coloring matter to unaltered chlorophyll is approximately 2.6 to 1. Continued heating beyond this period of time, at or near the optimum temperature, results in a further conversion but at a less rate with increasing increments of time.

In order to prepare canned spinach, or other canned vegetable containing chlorophyll, with a green color which is substantially that of the spinach or other vegetable containing its unaltered chlorophyll, we have found it desirable to carry out the heat process for approximately 20 minutes, or until the ratio of stable green coloring matter to unaltered chlorophyll is in excess of 3.2 to 1. When carried to this extent, the resultant packed spinach will have a green and natural appearance after retorting. During retorting the unaltered chlorophyll will be destroyed with the formation of pheophytin but the stable green coloring matter which we believe to be chlorophyllide is not affected by the heat, or is decomposed into another green substance.

After leaving the heating chamber 6 the sealed cans are passed to the retort 7 where the spinach is retorted or sterilized.

In the preferred example of the process embodying our invention employing spinach, we have found that it is preferable to wilt the spinach in the blancher 3 in hot water heated to such temperature that the spinach itself will be in the blancher at a temperature of between 155 to 160° F. and to continue this blanching for approximately 4 minutes. We have found that under such conditions the spinach will be sufficiently wilted to enable the requisite quantity or weight of spinach to be packed into the cans.

Under our preferred process we prefer to maintain the spinach at this optimum temperature of between 155 and 160° F. as it is stuffed into the cans in the canning step 4. As this canning step requires a very short period of time, and as under our preferred operation the maintaining of the spinach at the optimum temperature has not continued for a sufficient period of time to raise the ratio of stable green coloring matter to unaltered chlorophyll to a high enough ratio, we prefer to continue maintaining the temperature of the spinach at between 155 to 160° F. in the exhausting apparatus and in the sealing apparatus, both of which apparatus are of well known construction so that they need not herein be specifically described. The exhausting and sealing operation may then also not require a sufficient period of time to maintain the spinach at the optimum temperature of between 155 to 160° F. until the desired ratio of stable green coloring matter to unaltered chlorophyll has been attained. We then prefer to pass the sealed cans of spinach through a heating chamber, which may be of any suitable or desirable construction, in which the spinach is further maintained at between 155 to 160° F. until the desired ratio has been obtained, which time we have found to be nearly 20 minutes, and as heretofore set forth, we prefer to maintain the spinach at this optimum temperature until the ratio of stable green coloring matter to unaltered chlorophyll is above the ratio of 3.2 to 1.

From Figure 2 it will be apparent that the process should be carried out at temperatures between substantially 130° F. and 168° F. because it is apparently only between these temperatures that the enzymatic reaction occurs to convert the chlorophyll to the stable green coloring matter.

As will be apparent from Figure 3, as the temperature at which the reaction is carried out reaches 155° F. proceeding from approximately 140° F., the rate of conversion increases rapidly. From 155° F. to approximately 170° F. the rate of conversion of the chlorophyll to the stable green coloring matter, or the enzymatic reaction, falls off rapidly so that above approximately 170° F. no conversion takes place, and we have found that if, for example, the spinach is maintained at a temperature of 170° F. for a period of time, that substantially all of the enzyme is destroyed, with the result that treatment thereafter of the spinach at the optimum temperature of 155 to 160° F. does not act to convert any material quantity of the chlorophyll to the stable green coloring matter. Apparently the conditions are such that if the spinach is at any time during the operation treated at a temperature sufficiently high, the enzymes which cause the enzymatic reaction of conversion of the chlorophyll to chlorophyllide are destroyed so that subsequent treatment of the spinach at or near the optimum temperature does not have the effect of converting the chlorophyll to the stable green coloring matter.

Continued and long treatment of the spinach below the temperatures as illustrated by Figure 2 does not result in the conversion of an appreciable quantity of chlorophyll to chlorophyllide or the stable green coloring matter.

From a consideration of Figures 2 and 3 it will be observed that time and temperature control the conditions with which the spinach or other chlorophyll-containing vegetable should be treated, depending upon the particular conditions of operation and the particular vegetable employed and the particular conditions at which it is required that the process be carried out. For example, if the apparatus is not of sufficient capacity to permit the operation of the process for 20 or 25 minutes, it is possible to obtain the substantial conversion of the chlorophyll to the stable green coloring matter when operating at about 155° F. and continuing the operation for approximately 10 minutes, and conversely, if the apparatus is of sufficient capacity to permit extended operation as to time, it is possible to operate the process through wider temperature ranges. By enzyme as used in this specification applicants refer to that catalytic body or what is apparently an enzyme through the agency of which the reaction to convert the chlorophyll to a stable green coloring matter is carried out.

Having fully described our invention, it is to be understood that we do not wish to be limited to the details herein set forth, but our invention is of the full scope of the appended claims.

We claim:

1. A method of preparing spinach or similar green-leaf vegetable for canning, including washing the spinach, passing the spinach through a liquid bath at a temperature of approximately 160° F., placing the spinach in cans, subjecting the spinach in the cans to a second heat treatment at a temperature between 140° to 170° F. for a period of time sufficient to enable the conversion of a major portion of the chlorophyll to a stable green coloring matter and for a substantial portion of the total time of heating of the spinach between the said temperatures, and then retorting the spinach in the cans.

2. A method of preparing spinach or similar green-leaf vegetables for canning, including the steps of washing the spinach, passing the spinach through a liquid bath at a temperature at which an enzymatic reaction takes place to convert the unstable chlorophyll into a heat stable green coloring matter, placing the spinach in cans, subjecting the spinach in cans to a second heat treatment at a temperature of between 140° to 170° F. for a substantial portion of the total time of heating of the spinach between the said temperatures at which the enzymatic reaction continues to convert a major portion of the unstable chlorophyll into the heat stable green coloring matter, and then retorting the spinach in the cans.

3. A process of preparing spinach for canning which includes the steps of blanching or wilting the spinach at a temperature insufficient to destroy the enzymes therein, subjecting the spinach in the cans to a second heat treatment, the temperature of which is regulated to between 140° to 170° F. where the enzymes react to convert a portion of the chlorophyll to stable green coloring matter, the second heat treatment being continued for a substantial portion of the total time of heating of the spinach and for a time sufficient to enable the conversion of a major portion of the chlorophyll to a stable green coloring matter.

4. A process of preparing spinach for canning which includes the steps of blanching or wilting the spinach at a temperature between 140° and 170° F. for a period of time sufficient to wilt the spinach thereof to enable its packing into cans, packing the spinach in cans, and thereafter subjecting the spinach to a second heat treatment where the temperature of the spinach is maintained at between 140° to 170° F. to aid in the setting of the color thereof, and then passing the spinach through a cooking and sterilizing retort, the second heat treatment being continued for a substantial portion of the total time of heating of the spinach and for a time sufficient to enable the conversion of a major portion of the chlorophyll to a stable green coloring matter.

5. A method of improving the color of spinach for canning, including the steps of blanching the spinach at a temperature at which the enzymes thereof are active to convert the chlorophyll to a heat resistant green color compound, placing the spinach in cans, subjecting the spinach to a second heat treatment at a temperature below 170° F. the temperature at which said enzymes become inactive or killed, and thereafter cooking and sterilizing the spinach, the second heat treatment being continued for a substantial portion of the total time of heating of the spinach and for a time sufficient to enable the conversion of a major portion of the chlorophyll to a stable green coloring matter.

6. A process of preparing spinach for canning, which includes the steps of maintaining the temperature of the spinach between 140 and 170° F. during blanching and can stuffing and for a period of time thereafter at a temperature below 170° F. at which temperature the enzymes of the spinach become inactive or killed to convert the chlorophyll into heat resistant green coloring matter, and thereafter cooking and sterilizing the spinach, so that a substantial portion of the total time of heating of the spinach between the said temperatures is carried out after blanching and for a period of time sufficient to enable the conversion of a major portion of the chlorophyll to a stable green coloring matter.

7. A process of preparing spinach or other similar vegetables for canning which includes the steps of washing the vegetables, wilting the vegetables, placing the vegetables in cans, exhausting and sealing the cans, and then retorting the cans in which process the vegetable is maintained at approximately the optimum temperature of 155 to 160° F. through the steps of wilting to the step of retorting to enable a major portion of the chlorophyll of the vegetable to be converted into a stable green coloring matter.

8. The process of preparing spinach for canning which includes the steps of blanching or wilting the spinach at a temperature insufficient to destroy the enzymes therein but sufficiently high to permit the enzymatic action to convert the unstable green coloring matter to a stable green coloring matter, retorting the spinach and between the steps of blanching and retorting the spinach, passing the spinach through a second process step where the spinach is maintained at a temperature like that set forth for the blanching thereof and for a period of time sufficient to enable the enzymatic reaction to continue until a major portion of the unstable green coloring matter has been converted to the stable green coloring matter.

BYRON E. LESLEY.
JAMES W. SHUMATE.